May 10, 1932.   A. J. HARTFIELD ET AL   1,857,504
THERMOSTATIC CONTROL FOR BURNERS
Filed April 16, 1930
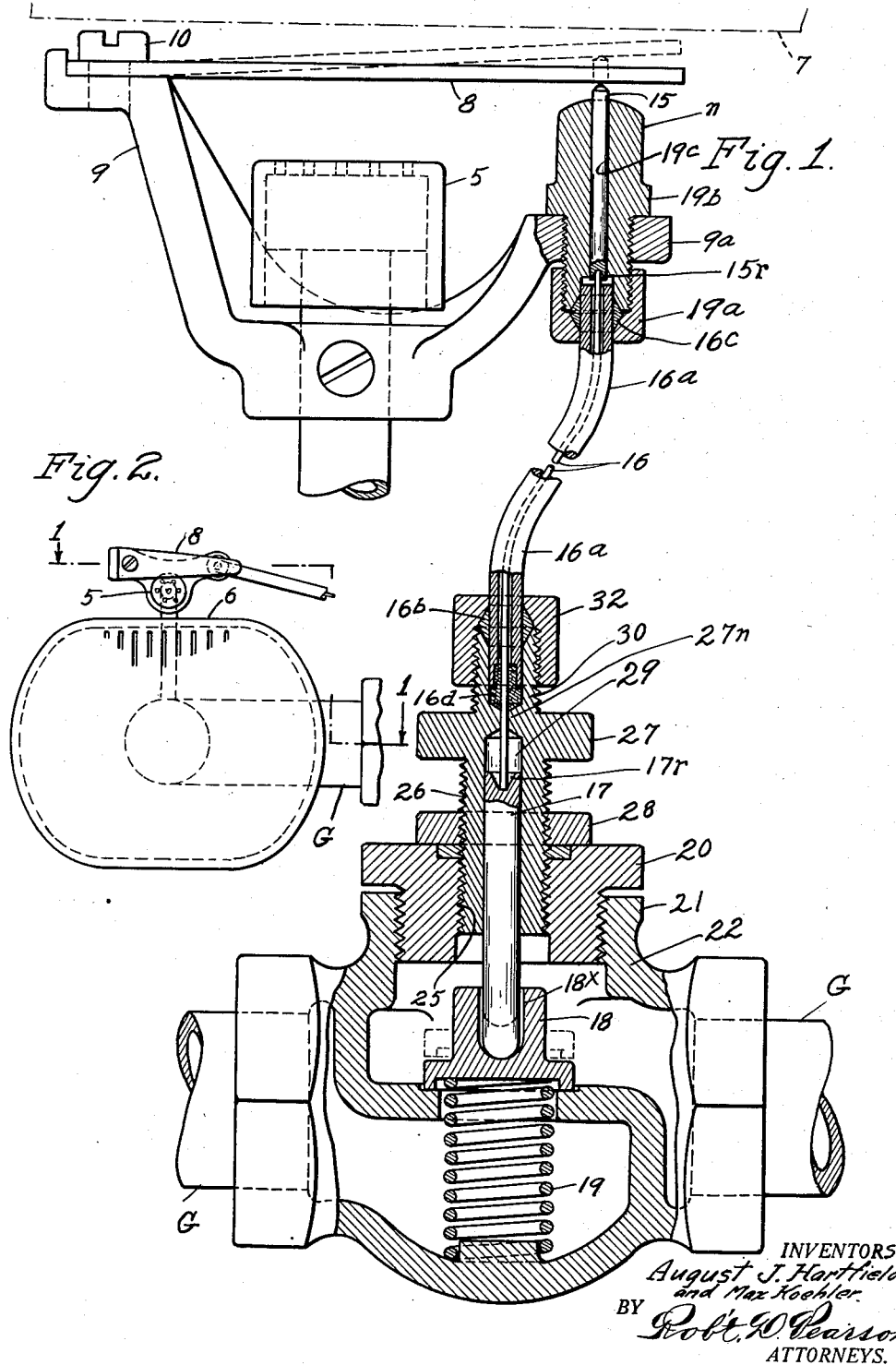

Patented May 10, 1932

1,857,504

UNITED STATES PATENT OFFICE

AUGUST J. HARTFIELD AND MAX KOEHLER, OF HUNTINGTON PARK, CALIFORNIA

THERMOSTATIC CONTROL FOR BURNERS

Application filed April 16, 1930. Serial No. 444,744.

This invention relates to a thermostatic control for safety pilot valves. An object of the invention is to improve upon other devices of the kind in respect to convenience for installation as a part of the heating equipment of the building, the device being so constructed that the gas supply conduit and the valve for controlling the flow of gas therethrough may be located at various distances from the burner or appliance to be heated and yet the thermostatic control therefor be connected up therewith by the fitter without difficulty or waste of time.

Another object of the invention is to provide more accurate and dependable means for adjusting the operating connection between the thermostat and the valve controlled thereby so as to predetermine in a satisfactory manner at what degree of heat said valve will be opened.

Other objects of the invention are to generally improve upon, simplify and render more dependable the construction of the thermostat and the means operated thereby.

Still another object of the invention is to provide an adjustable safety device for a pilot light with thermostatic operating means to control a main check valve which remains closed when the pilot light is extinguished.

Other objects, advantages and features of invention may hereinafter appear.

Referring to the accompanying drawings which illustrate what is at present deemed to be a preferred embodiment of the invention, Figure 1 is a vertical mid-section of the complete apparatus, the position of the thermostat when cold being shown in full lines, and its position when hot being indicated in dotted lines. This view is taken on irregular line 1—1 of Fig. 2.

Fig. 2 is a plan view of the device on a smaller scale than Fig. 1.

Referring in detail to the drawings, the pilot burner 5 and main burner 6 are shown positioned beneath a tank 7 which contains liquid to be maintained in a more or less heated condition. Between said burners 5 and 6 and near the bottom of the tank 7 is interposed the thermostatic arm or plate 8, said arm being preferably secured near one end thereof to one side of the burner head 9 by means of a stove bolt or screw 10. This thermostatic arm is of the well known bi-metallic construction, so that when the thermostat is heated it will be deflected laterally.

With said thermostatic arm cooperates a motion transmitting device which consists of a driving element 15, a connection 16, desirably of piano wire, said connection being slidably contained within a soft metal guide tube 16a and being adapted to transmit the power to a considerable distance from the driving element 15, and a valve operating device. The valve-operating means comprises a driven element 17 which controls the valve proper 18 and acts against the opposition of a spring 19 that tends to unseat said valve proper 18. The operating connection between the thermostatic arm 8 and the driven element 17 also comprises an adjusting device which will next be described and which controls the relative positions of said driven element 17 and connection 16 in order to predetermine the extent to which the valve proper 18 will be opened by a certain amount of heat.

Said adjusting device includes an elongated nut n which screws into a flange 9a of the burner head 9 and on to the lower end of which is screwed an apertured nut 19a. Said elongated nut n is desirably provided with an external annular flange 19b which extends therearound at about its mid-length and which may seat upon the top surface of the burner flange 9a. Nut n has a bore 19c extending therethrough within which slidably seats the driving member 15 already referred to. Said adjusting device also includes an external adjusting nut 20 which screws into an internally threaded nipple 21 with which the valve casing 22 is provided. Said nut 20 is, in turn, provided with a screw threaded passage 25 into which screws the screw threaded stem 26 of an internal adjusting nut 27. A lock nut 28, screwing on to said internal adjusting nut 27, serves to maintain said nut in the adjusted position.

The driven element 17, which has already been referred to, preferably is a short rod which has a working fit within a bore 29 within the shank 26 of the nut 27. Upon the upper end of said rod 17 is seated the connection 16 thus making a direct operative connection between the driving member 15 and said driven member 17. The upper portion of nut 27 is provided with an externally screw threaded tubular extension 30 into the upper end of which extends the connection tube 16a with a loose fit. An apertured nut 32 is slipped over the tube 16a from its other end and is then screwed upon said extension. Said tube is provided with an extension 16b which extends therearound and thus enables the nut 32 to hold the adjacent parts in the proper operative relation to each other.

The end portion of the bendable tube 16a which is connected with the driving member 15 is provided with a swell or bead 16c which extends therearound, and the nuts n and 19a which have already been described are bevelled internally as shown in Fig. 1 in order to receive said bead 16c when the parts are in place, thus maintaining the tube 16a in the assembled position.

At the other end of tube 16a a packing recess 16d is provided wherein a packing may be inserted to seal the connection at the end of tube 16a against the escape of gas.

The lower end of the slidable rod 15 which forms the driving member is provided with a conical recess 15r in order to support said rod 15 centrally upon that end of the wire 16; and the upper end of the rod or follower 17 which forms the driven member is provided in its upper end with a like conical recess 17r to receive the adjacent end of the wire 16. It is to be understood that the top of the driving member 15 will always be in contact with the thermostatic bar 8, and at the other end of the bendable connecting pipe 16a the spring 19 will (except when valve 18 is seated) maintain the upper end of the driven member 17 in contact with the adjacent end of the wire 16. That is to say the construction of the movement transmitting assembly is such that a force at one end thereof always opposes a force at the other end thereof, thus maintaining all parts of the entire chain of movement transmitting elements in the proper operative relations to each other.

After the fitter has put in place the gas fittings in the usual manner, locating the valve casing 22 at a convenient distance from the pilot valve 5 but in any desired direction therefrom, he will next put in place the fittings which receive and control the driving element 15 and the driven element 17. He will then place the end portions of the bendable tube 16a in proper relation to the fittings with which said tube is connected and after seeing to it that all the various parts are located as shown in Fig. 1, he will feed the wire 16 through the tube 16a and will then adjust the threaded members at each end of the tube 16a in order to cause the upward movement of the thermostatic arm 8 to permit the spring 19 to open the valve 18. Owing to the fact that the driving member 15 and driven member 17 are not attached to the wire 16, but loosely contact therewith, the work of assembling the various parts of the device is simplified.

The driving member 15, being a rod of considerably greater diameter than the wire 16, forms a more dependable operative connection with the thermostatic bar 8 than would result if the end of said wire 16 contacted directly with said bar 8. The independent driving member 15, pointed at one end to engage the thermostatic bar 8, and having a central recess in its other end to receive the adjacent end of the driven element or wire 16 is, so far as we know, new in the art to which our invention pertains.

The passage through the nut 27 is provided with a contracted portion 27n within which the wire 16 fits with a working fit, and the valve 18 is provided with a socket 18x to receive the lower end of the driven elements 17, thus to form a dependable operative connection with said valve in order to control the flow of gas through the conduit G.

Claims:

1. In a device of the class described, a driving element, a thermostatic element independent of and contacting said driving element and operable when heated to move said driving element in one direction, a flexible resilient connection independent of and continually impinging upon said driving member, a guide for said flexible member, a valve movable in one direction by pressure from said flexible member, and a spring tending to move said valve in the opposite direction.

2. A thermostatic construction comprising a thermostatic arm one end of which is maintained in a fixed position, a longitudinally movable rod independent of said thermostatic arm and contacting the opposite end of said arm in order that said rod may be moved longitudinally by said arm, a guide movably supporting said rod, said rod having an axial recess in the end thereof which is directed away from said arm, a flexible resilient wire having an end portion loosely seated in said recess, a combined guide and support for said wire along which said wire is longitudinally movable, a device at the other end of said wire movable in one direction by pressure therefrom, and means which bears against said device and thereby maintains a compressive stress upon all parts thereof thus holding said wire in contact with the recess in the aforementioned rod.

In testimony whereof we hereunto affix our signatures.

AUGUST J. HARTFIELD.
MAX KOEHLER.